(No Model.)

W. CORLISS.
WHEEL TIRE.

No. 584,108. Patented June 8, 1897.

WITNESSES:
M. F. Bligh.
Chas. H. Luther Jr.

INVENTOR:
William Corliss
by Joseph A. Miller & Co.
Attys.

UNITED STATES PATENT OFFICE.

WILLIAM CORLISS, OF PROVIDENCE, RHODE ISLAND.

WHEEL-TIRE.

SPECIFICATION forming part of Letters Patent No. 584,108, dated June 8, 1897.

Application filed November 29, 1895. Serial No. 570,477. (No model.)

*To all whom it may concern:*

Be it known that I, WILLIAM CORLISS, of the city of Providence, county of Providence, and State of Rhode Island, have invented a new and useful Improvement in Wheel-Tires; and I hereby declare that the following is a full, clear, and exact description of the same, reference being had to the accompanying drawings, forming part of this specification.

This invention has reference to improvements in what are known in the art as "cushioned" or "elastic" tires, which are used largely on bicycles. Most of this class of tires are dependent on an internal air-pressure for their elasticity or resiliency. The pneumatic construction meets all the requirements of a perfect tire, except that it lacks reliability and durability. As a toy it is perfect. As a reliable and durable machine it does not meet the requirements. The liability to be punctured at a critical moment has not been satisfactorily overcome.

One object of this invention is to so construct the tire that no internal air-pressure is required and the efficiency of the tire is not destroyed or impaired when the inclosing cover is punctured or cut.

Another object of the invention is to give to the tire a practically continuous spring-support at all parts liable to come in contact with the road.

Another object of the invention is to so construct the tire that it will readily yield to small rocks or other minor obstructions on the road-surface without raising the tire or disturbing the wheel.

A further object of the invention is to construct a spring-supported tire in which the compression of the springs is limited; and another object of the invention is to so construct a spring that the tire will yield freely to transverse strain without tilting the tread of the tire.

The invention consists in the peculiar and novel construction of the spring-support and the combination of parts more fully set forth hereinafter and more particularly pointed out in the claims.

The invention is applicable to all kinds of carriage, bicycle, and other wheels and is also applicable to the rims of bicycle-wheels as heretofore constructed.

Figure 1:
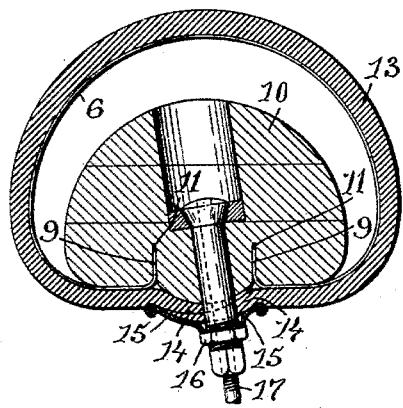
Figure 2:
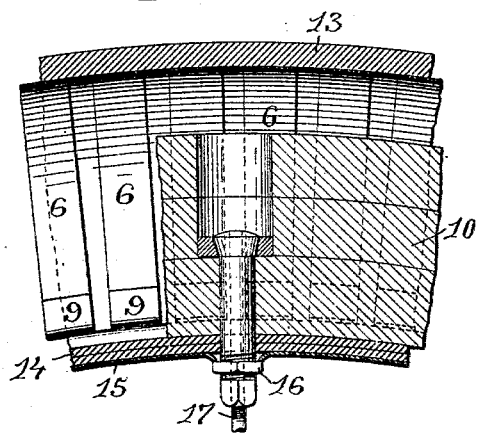
Figure 3:
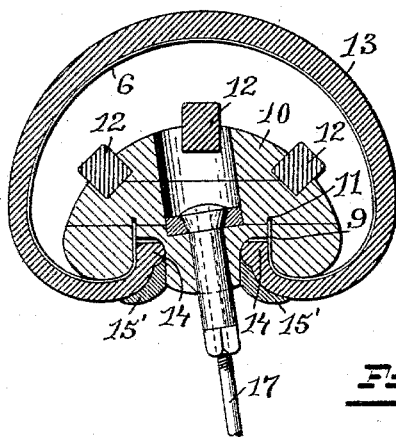
Figure 4:
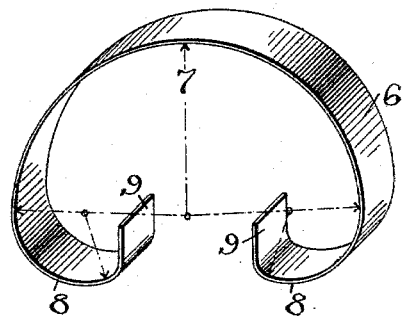

Figure 1 is a transverse sectional view of a wheel-rim provided with my improved tire. Fig. 2 is a longitudinal sectional view of a wheel-rim provided with my improved tire. Fig. 3 is a transverse sectional view of a modified form of a wheel-rim provided with cushioned bearings by which the compressing of the springs beyond a fixed limit is yieldingly resisted. Fig. 4 is a view of the spring.

Similar numbers of reference indicate corresponding parts in all the figures.

The essential qualities in a spring-tire are, first, that it shall possess all the advantages of the pneumatic tire without its defects and sufficient elasticity to secure the desired comfort to the rider; second, sufficient resiliency in the springs to maintain the rounded conditions of the tread of the tire when the wheel is loaded with its normal load and thereby present as narrow a contact with the road-bed as possible; third, a free lateral or transverse play to every portion of the tire, so that when either side of the tire passes over a pebble or other similar obstruction the spring at that particular place will yield sufficiently to cover the obstacle without exerting a lifting action on the tire; fourth, all parts of the tire should yield locally to small obstructions or irregularities in the road-bed without exerting a lifting action on the tire or wheel; fifth, the arched portion of the springs should form as large a section of as large a circle as possible, and, sixth, the compression of the springs must be limited to a point much within the limit of the elasticity of the springs, so as to secure durability; seventh, the springs must at all positions fill the envelop, so as to maintain it in the expanded condition and prevent the crimping, creasing, and breaking of the envelop.

In the drawings the spring 6 (shown in Fig. 5) is the result of carefully-conducted practical tests. The central portion of the spring forms a regular semicircular arch 7, connecting on each side with curves of smaller diameter which form spring-supports 8 for the arch and terminating in the end plates 9 9, by which the spring is held in the rim against bodily lateral movement. The end plates 9 9 need not extend into the rim to the extent shown in the drawings. Mere rudimentary ends to hold the spring in place are sufficient.

If this spring is placed on a surface with the supports 8 resting on the same and pressure is exerted on the top of the arch, the spring readily yields to such pressure, and if the pressure is exerted transversely the spring will rock from side to side on the curved supports 8 8 without any tendency to slide sidewise, thus clearly demonstrating the peculiar adaptability of the spring to its use in the tire.

To secure as large a spring as practicable, I carry the spring below the rim in the preferred forms shown in the drawings, but do not wish to limit myself to the precise constructions shown.

The rim 10 is provided with the cuts or recesses 11, into which the end plates 9 of the spring are entered and held against transverse displacement. The rim 10 is of approximately oval shape or cross-section, so that the spring 6 will have full play to yield vertically and laterally and limit the compression of the spring. The cross-sections of the rim 10 may vary considerably, as is indicated in the drawings, in which the rims 10 of the different figures differ considerably, but all are adapted to permit of the perfect free action of the spring 6 vertically and laterally within the desired limits. The rim may be provided, and in the preferred form is provided, with one or more elastic cushions 12, secured in grooves made in the rim 10, as is shown in Figs. 3 and 4, or they may be in any other suitable manner secured thereto.

The springs 6 6 are placed close together, as is shown in Fig. 2, and are covered with the envelop 13, preferably made in part or whole of india-rubber or some other suitable material. This envelop 13 is formed into a tube and incloses the series of springs 6 6, by which the envelop is maintained in its expanded tubular shape. The envelop is preferably secured along its edges 14 to the rim 10 and may be secured in any well-known manner or as shown in the drawings. In Fig. 1 the edges are lapped and they are secured to the rim 10 by the rim-plate 15, held against the lapped ends 14 of the envelop 13 and pressed against the rim 10 by the nut 16 on the shank of the spoke 17. In Fig. 1 the edges 14 are shown secured in a groove and held in place by the ring-plates 15′, which form, preferably, two continuous rings, and in the modifications shown in Fig. 4, adapted for use on bicycles provided with a concaved rim and which is also adapted for use on the usual construction of carriage or other wheels, the edges 14 of the envelop 13 are secured by the plate 18, which may be a continuous ring or consist of a number of sections. The edges may, however, be secured by the piece 21. The tire is secured to the ordinary wheel-rim by means of the screw 19, and to adapt the same for use on a bicycle-wheel provided with the concaved rim 20 the piece 21 is first placed into the concavity of the rim 20.

The series of springs 6, which, as shown in the drawings, are placed close together, forming of themselves an elastic tire without the envelop 13, but any kind of an envelop will add materially to the durability of the spring and tire and a serviceable elastic envelop much increases the durability and adds to the resiliency of the tire.

A tire constructed after my invention yields locally to small projections in the road-surface without lifting the wheel. It forms a uniformly elastic bearing for the wheel, and even when the envelop is punctured or partially torn continues to form a substantial and useful elastic tire, possessing all the useful qualities of a pneumatic tire, combined with durability, endurance in rough usage, and reliability against breakdowns not possessed by the pneumatic tire.

Having thus described my invention, I claim as new and desire to secure by Letters Patent—

1. A wheel-tire consisting of a series of independent metallic springs the ends of which are inserted into grooves on the inner portion of the rim of the wheel, substantially as described.

2. A wheel-tire consisting of a series of independent metallic springs inclosing the rim of the wheel, placed transversely to the rim and secured to the inner portion of the rim, substantially as described.

3. A spring for a wheel-tire formed of a strip of sheet metal longitudinally bent to form the central arch 7, the inwardly-curved bearings 8, and the ends 9, 9, adapted to enter grooves in the rim and yield to vertical and lateral pressure, substantially as and for the purpose described.

4. In a wheel-tire the combination with the rim of a series of metallic springs inclosing the rim and secured to the inner portion of the rim, constructed to yield vertically and laterally independent of the rim to an extent limited by the rim, as and for the purpose described.

5. A wheel-tire consisting of a rim, a series of independent metallic springs the ends of which are secured in the inner portion of the rim so as to inclose the same, and an envelop inclosing the springs and the rim, the edges of the envelop secured to the inner portion of the rim, as described.

6. A wheel-tire consisting of a series of independent metallic springs placed transversely to the rim of the wheel and inclosing the same, and a flexible envelop inclosing the springs, the edges of the envelop secured to the inner portion of the rim, as described.

7. A wheel-tire consisting of a series of independent sheet-metal springs, bent to form a central arch and inwardly-curved ends, a wheel-rim and a flexible envelop, the springs and the envelop practically inclosing the rim, whereby a longer spring and greater flexibility are secured, as described.

8. In a wheel-tire the combination with the rim of the wheel, of a series of independent metal springs inclosing an area larger than the rim, having their ends secured to the inner portion of the rim, and a flexible envelop extending over and inclosing the springs and having the edges secured to the inner portion of the rim, as described.

9. In a wheel-tire the combination with the envelop 13 and the series of transverse springs 6 of the rim 10 of approximately oval cross-section of smaller cross-sectional area than the area inclosed by the springs, whereby the rim limits the yielding movement of the springs, as described.

10. In a wheel-tire the combination with the wheel-rim 10 and the elastic cushions 12 secured thereto, of the series of independent springs 6 inclosing the rim and the envelop 13 inclosing the springs, the springs and the envelop secured to the inner portion of the rim, as described.

In witness whereof I have hereunto set my hand.

WILLIAM CORLISS.

Witnesses:
JOSEPH A. MILLER,
JOSEPH A. MILLER, Jr.